United States Patent
Azar et al.

(10) Patent No.: US 7,974,485 B1
(45) Date of Patent: Jul. 5, 2011

(54) SPLIT-FRAME POST-PROCESSING IN A PROGRAMMABLE VIDEO PIPELINE

(75) Inventors: Hassane S. Azar, San Francisco, CA (US); Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1620 days.

(21) Appl. No.: 11/261,106

(22) Filed: Oct. 27, 2005

(51) Int. Cl.
G06K 9/40 (2006.01)
G06K 9/32 (2006.01)

(52) U.S. Cl. ............... 382/254; 382/266; 382/298

(58) Field of Classification Search .................. None
See application file for complete search history.

(56) References Cited

U.S. PATENT DOCUMENTS

| | | | | |
|---|---|---|---|---|
| 5,113,455 A * | 5/1992 | Scott | | 382/298 |
| 5,459,528 A * | 10/1995 | Pettitt | | 348/568 |
| 5,517,612 A * | 5/1996 | Dwin et al. | | 345/502 |
| 5,838,463 A * | 11/1998 | Gahang | | 358/465 |
| 5,953,464 A * | 9/1999 | Harrington | | 382/299 |
| 6,898,319 B1 * | 5/2005 | Hazra et al. | | 382/232 |
| 7,616,829 B1 * | 11/2009 | Bilbrey et al. | | 382/268 |
| 7,623,728 B2 * | 11/2009 | Avinash et al. | | 382/275 |
| 7,724,981 B2 * | 5/2010 | Curtis | | 382/274 |
| 7,805,003 B1 * | 9/2010 | Cohen et al. | | 382/173 |
| 2002/0118861 A1 * | 8/2002 | Jouppi et al. | | 382/103 |
| 2002/0122601 A1 * | 9/2002 | Peng | | 382/250 |
| 2003/0012436 A1 * | 1/2003 | Lyford et al. | | 382/167 |
| 2003/0063213 A1 * | 4/2003 | Poplin | | 348/362 |
| 2004/0028292 A1 * | 2/2004 | Alm et al. | | 382/298 |
| 2005/0007490 A1 * | 1/2005 | MacInnis et al. | | 348/448 |
| 2006/0050089 A1 * | 3/2006 | Soroushi | | 345/660 |
| 2007/0003152 A1 * | 1/2007 | Hoppe et al. | | 382/240 |
| 2008/0152245 A1 * | 6/2008 | El-Maleh et al. | | 382/254 |
| 2010/0027686 A1 * | 2/2010 | Zuo et al. | | 375/240.29 |

* cited by examiner

*Primary Examiner* — Vikkram Bali
*Assistant Examiner* — Michelle Entezari
(74) *Attorney, Agent, or Firm* — Kilpatrick Townsend & Stockton LLP (57) ABSTRACT

Split-frame post-processing techniques are used in a programmable video post processing engine. A frame of video data is divided into a processing region and a control region that contain either different portions of the frame or copies of a portion of the frame. Post-processing operations are performed for the processing region but not for the control region. The processing and control regions are then displayed simultaneously on the same display device (e.g., side by side), facilitating visual comparisons of images with and without post-processing.

24 Claims, 5 Drawing Sheets

SPLIT-FRAME POST-PROCESSING IN A PROGRAMMABLE VIDEO PIPELINE

BACKGROUND OF THE INVENTION

The present invention relates in general to video playback, and in particular to split-frame post-processing in a programmable video pipeline.

Playback of digital video data generally includes reading encoded digital video data from a source (e.g., a DVD, stored MPEG file, or the like), decoding the data to generate sequences of pixel values, and delivering signals corresponding to the pixel values to a display device at a regular rate (e.g., 30 frames per second). Additionally, the decoded data is usually "post-processed" to optimize it for display on a given device. For example, the PureVideo™ video processing system by NVIDIA Corp., assignee of the present application, performs deinterlacing, edge enhancement, LCD overdrive, and scaling of digital video data. Deinterlacing is performed when the video data is formatted for an interlaced display device (e.g., a conventional NTSC-compliant television set) and the display device being used is a progressive-scan device (e.g., a computer monitor or high-definition television). Edge enhancement sharpens the edges of objects in the image, making a clearer picture. LCD overdrive, used for LCD displays, adjusts the pixel driving signals based on differences in pixel color and/or intensity between successive frames, thereby compensating for the relatively slow response time of such displays. Display scaling enlarges or reduces the image to correspond to the number of pixels on the screen by interpolating between pixel values. Numerous post-processing algorithms are known in the art and routinely used to provide clearer, sharper video images.

It can, however, be difficult for a viewer to appreciate the effects of such post-processing on the images being displayed. Typically, it is possible to enable or disable post-processing in a video playback system, and a viewer can watch a particular video clip without post-processing, then watch the same clip with post-processing. But this procedure does not provide a direct, side-by-side comparison of the two clips. At trade shows or other sales kiosks, a direct comparison can be provided by setting up two identical systems with their displays placed side by side. One system is configured to perform post-processing while the other is not, and the same video is played back on both systems simultaneously. If the two systems are perfectly synchronized and have identical displays, viewers can directly perceive the effect of post-processing.

Setting up such a system, however, can be difficult. First, the two systems need to have identical display devices so that the viewer can be certain that any differences in the two images are the result from the post-processing rather than variations in the display devices. Second, it is difficult to synchronize playback across two systems. Even if both systems receive identical video data and a user presses the "play" button on both systems at the same time, small variations in startup behavior can de-synchronize the images.

In addition, optimal settings for video post-processing generally depend in part on the display device and the video source, and some manufacturers provide interfaces enabling a user to adjust settings to optimize the picture. But determining optimal settings can be difficult for a user, especially since most users do not have a second identical system available to use for comparison.

It would therefore be desirable to provide improved techniques for comparing images with and without post-processing.

BRIEF SUMMARY OF THE INVENTION

Embodiments of the present invention provide split-frame post-processing techniques for use in a programmable video post-processing engine. An image (e.g., a frame of video data) is divided into a processing region and a control region. For instance, in some embodiments, the left half of the image might be the processing region while the right half is the control region; in other embodiments, a portion of the image is replicated, with one replica being used as the processing region and the other as the control region. Post-processing operations are performed for the processing region but not for the control region. The processing and control regions are then displayed simultaneously on the same display device (e.g., side by side), making it easy for a user to compare images with and without post-processing. Such comparisons can be used, e.g., to evaluate the effectiveness of video post-processing algorithms or to optimize the post-processing settings for a particular video stream.

According to one aspect of the present invention, a method for providing video data to a display via a video processor that includes a post processing pipeline having programmable modules includes defining, for a frame of the video data, a processing region and a control region. A first module of the post processing pipeline is programmed to perform a first post processing algorithm on pixels in the processing region and not on pixels in the control region. Video data for the frame is provided to the video processor, and the first module of the post processing pipeline performs the first post processing algorithm on pixels in the processing region and not on pixels in the control region. For instance, the first post-processing algorithm might be one of a deinterlacing algorithm, an edge enhancement algorithm, an LCD overdrive algorithm, or a scaling algorithm.

In some embodiments, the first module is configured to perform the first post processing algorithm only on pixels within the boundaries defined by the state command, and programming the first module includes transmitting to the post processing pipeline a state command defining boundaries for the processing region of the image.

In some embodiments, the second module of the post processing pipeline may be programmed to perform a second post processing algorithm on pixels in the processing region and on pixels in the control region; for instance, the second algorithm might be a deinterlacing algorithm.

In other embodiments, a second module of the post processing pipeline is programmed to perform a second post processing algorithm on pixels in the processing region and to perform a third post processing algorithm on pixels in the control region, where the third post processing algorithm is different from the second post processing algorithm. For instance, the second and third post processing algorithms might be two different scaling algorithms.

In some embodiments, defining the processing region and the control region includes receiving user input selecting a desired processing region and determining a boundary of the desired processing region.

According to another aspect of the present invention, in a video processor, a method for providing pixel data to a display device includes receiving a state command defining, for a frame of video data, a control region and a processing region. After video data for the frame is received, a first post processing algorithm is performed on a first portion of the video data corresponding to the processing region of the frame and not on a second portion of the video data corresponding to the control region of the frame. Video data for the control region and the processing region is delivered to the display device, with the delivered video data for the processing region having been processed by the first post processing algorithm.

In some embodiments, the video processor includes a post processing pipeline having a plurality of programmable modules, and at least one of the programmable modules is responsive to the state command.

In some embodiments, the video data is received in an encoded form, and the method further includes decoding the video data. A first module of the video processing pipeline is configured to perform the first post processing algorithm, and the decoder is configured to deliver the video data corresponding to the processing region to the first pipeline module in response to the state command.

In some embodiments, a second post processing algorithm, such as a deinterlacing algorithm, is performed on pixels in the processing region and on pixels in the control region.

In other embodiments, a second post processing algorithm is performed on pixels in the processing region and not on pixels in the control region while a third post processing algorithm is performed on pixels in the control region and not on pixels in the processing region, with the third post processing algorithm being different from the second post processing algorithm. For instance, the second and third post processing algorithms can be two different scaling algorithms.

In some embodiments, prior to performing the first post-processing algorithm, the video data for the frame is modified such that the processing region and the control region each contain a copy of the same video data. The copies can be, e.g., identical copies or mirrored copies.

According to yet another aspect of the present invention, a video processor includes a decoder, a post-processing pipeline, and a scanout module. The decoder is configured to receive video data and to generate frames of pixels from the video data. The post processing pipeline, which is coupled to receive the pixels from the decoder, includes a first programmable post processing module configured to apply a first post processing algorithm to the pixels. The scanout module is coupled to receive processed pixels from the post processing pipeline and configured to deliver the processed pixels to a display device. The post processing pipeline is configurable such that the first programmable post processing module applies the first post processing algorithm to pixels in a processing region of a frame but not to pixels in a control region of the frame.

In some embodiments, the post processing pipeline further includes a second programmable post processing module, and the post processing pipeline is further configurable such that the second programmable post processing module applies a second post processing algorithm to pixels in the processing region but not to pixels in the control region.

In other embodiment where the post processing pipeline further includes a second programmable post processing module, the post processing pipeline is further configurable such that the second programmable post processing module applies a second post processing algorithm to pixels in the processing region and applies a third post processing algorithm, which is different from the second post processing algorithm, to pixels in the control region.

In some embodiments, the first post processing module is configured to receive a state command defining a boundary of the processing region and to apply the first post processing algorithm only to pixels inside the boundary defined by the state command.

In other embodiments, the decoder is configured to receive a state command defining a boundary of the processing region and to write pixels in the processing region to a first buffer and pixels outside the processing region to a second buffer, and the first programmable post processing module is configured to receive a command directing the first programmable post processing module to apply the first post processing algorithm only to pixels in the first buffer.

The following detailed description together with the accompanying drawings will provide a better understanding of the nature and advantages of the present invention.

DETAILED DESCRIPTION OF THE INVENTION

Embodiments of the present invention provide split-frame post-processing techniques for use in a programmable video post-processing engine. An image (e.g., a frame of video data) is divided into a processing region and a control region. For instance, in some embodiments, the left half of the image might be the processing region while the right half is the control region; in other embodiments, a portion of the image is replicated, with one replica being used as the processing region and the other as the control region. Post-processing operations are performed for the processing region but not for the control region. The processing and control regions are then displayed simultaneously on the same display device (e.g., side by side), making it easy for a user to compare images with and without post-processing. Such comparisons can be used, e.g., to evaluate the effectiveness of video post-processing algorithms or to optimize the post-processing settings for a particular video stream.

Figure 1:
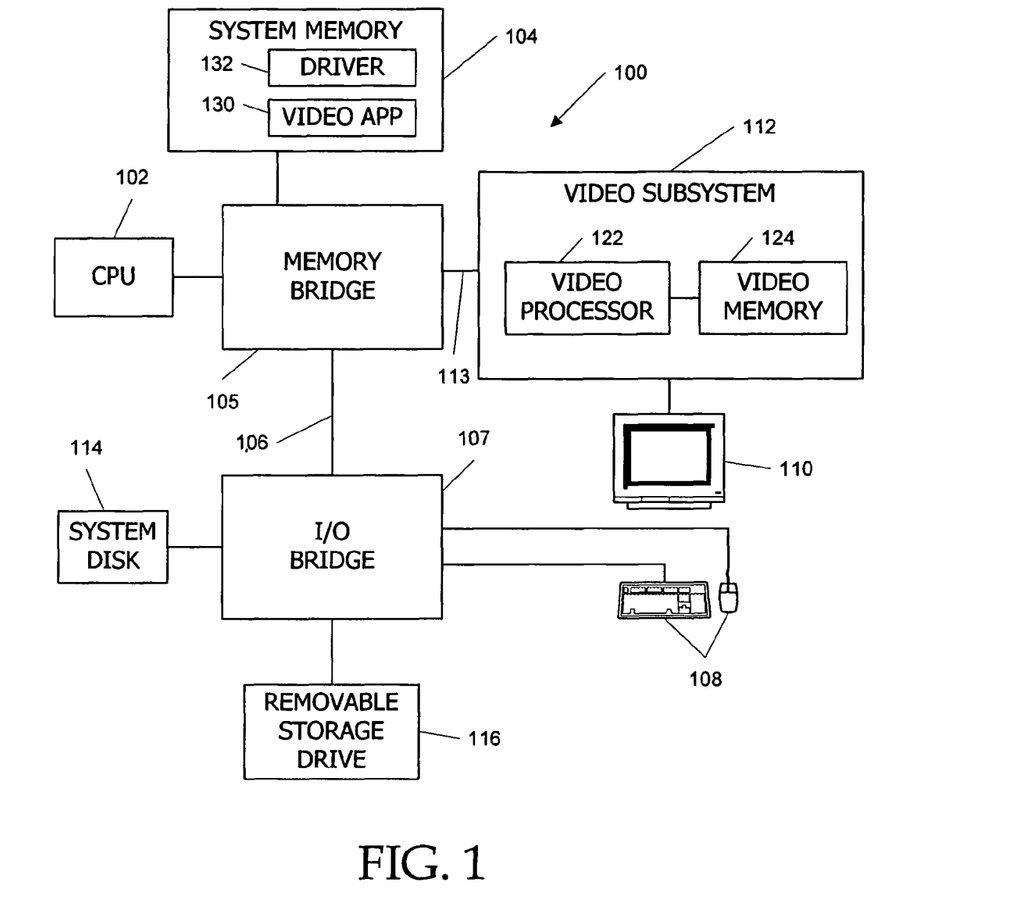
FIG. 1 is a block diagram of a computer system configured for video playback according to an embodiment of the present invention.

FIG. 1 is a block diagram of a computer system 100 configured for video playback according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Video output is provided on a pixel-based display device 110 (e.g., a conventional CRT or LCD based monitor, plasma TV monitor, or other display device)

operating under control of a video subsystem 112 coupled to memory bridge 105 via a bus 113. A system disk 114 is also connected to I/O bridge 107. A removable storage drive 116 (e.g., a DVD drive) is connected to I/O bridge 107; other components (not explicitly shown) such as a network adapter, USB or other port connections, CD drive, disk drive, and the like, may also be connected to I/O bridge 107. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Video subsystem 112 includes a video processor 122 and a video memory 124, which may be implemented, e.g., using one or more integrated circuit devices such as programmable processors, application specific integrated circuits (ASICs), and memory devices. Video processor 122 is configured to perform various post-processing operations, examples of which are described below, on video data received from video source 116 and to deliver frames of processed video data to display device 110. In some embodiments, video processor 122 buffers video data in video memory 124 so that the display of new frames can be synchronized with a raster scan operation of display device 110; conventional techniques may be used. For instance, video processor 122 might write pixels for a new frame in a "back" buffer while reading out pixels for a previous frame from a "front" buffer to display device 110; when the new frame is complete, the buffers are flipped and the new frame is read out. In some embodiments, video processor 122 may be implemented using a general-purpose graphics processor that is also capable of rendering images from 2-D and/or 3-D graphics data supplied by various programs executing on CPU 102, and video processor 122 may also be configurable to store and display pixel data received via memory bridge 105, e.g., from an operating system or application program executing on CPU 102.

CPU 102 operates as the master processor of system 100, controlling and coordinating operations of other system components. In particular, CPU 102 issues commands that control the operation of video processor 122. CPU 102 advantageously executes a video playback program 130 and a video driver program 132. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory mapped file on system disk 114, and/or in other storage space.

Video playback program 130, which may be of generally conventional design, includes program code for providing a user interface via which the user can specify a source location for video data (e.g., a DVD in drive 116, a video data file on system disk 114, streamed video received from a remote server computer via a network (not explicitly shown), or another source), start and stop playback, control playback speed, and the like. During playback, video playback program 130 transfers video data from video source 116 to video subsystem 112 for post-processing and display. In some embodiments, video playback program 130 may also provide other features, such as video editing functionality. A particular video playback program or video data source is not critical to the present invention, and a detailed description has been omitted.

A driver program 132 (also shown as resident in system memory 104) enables communication between video playback program 130 and video subsystem 112. Driver program 132 advantageously implements one or more standard application program interfaces (APIs) for communication with video processor 122; any number or combination of APIs may be supported, and in some embodiments separate driver programs 132 are provided to implement different APIs. By invoking appropriate API function calls, video playback program 130 can initiate, terminate, and control various operations of video processor 122. For instance, when a user operating video playback program 132 activates a "Play" control, video playback program 130 (via driver program 132) instructs video processor 122 to begin processing pixels from the video data stream and generating frames of video data. The specific commands and/or data transmitted to video processor 122 by driver program 132 in response to an API function call may vary depending on the implementation of video processor 122, and driver program 132 may also transmit commands and/or data implementing additional functionality (e.g., special visual effects) not controlled by video playback program 130. In some embodiments, driver program 132 (or video playback program 130) includes a user interface component that can be used to adjust settings of video processor 122 such as the split-frame post-processing features described below.

It will be appreciated that the system shown herein is illustrative and that variations and modifications are possible. The present invention may be implemented in any video processor, and such video processors can be incorporated into a variety of devices, including general-purpose computer systems (including but not limited to system 100), video game consoles, dedicated DVD players, digital video recorders, handheld devices including mobile phones or personal digital assistants, and so on. In some embodiments, the video processor and central processor may be provided in a single integrated circuit (chip) instead of in separate chips, and various features of the driver program and/or video playback program may be integrated into a single set of program instructions (or hardwired logic) for controlling operation of the video playback system.

Figure 2:
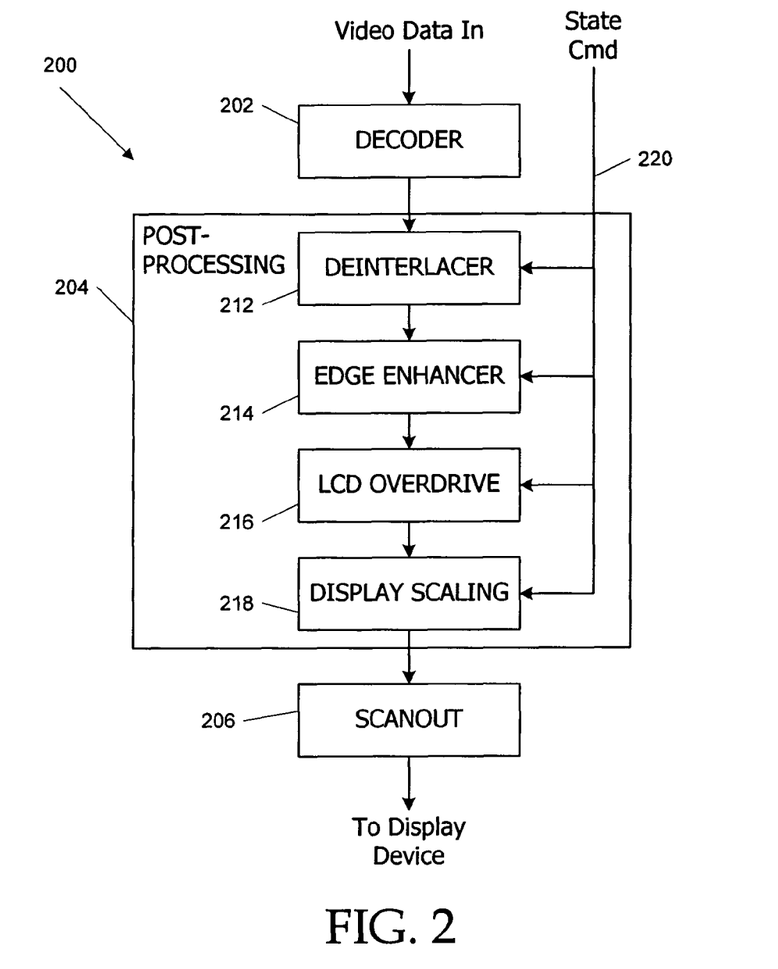
FIG. 2 is a block diagram of an architecture for a video processor according to an embodiment of the present invention.

In accordance with an embodiment of the present invention, the video processor decodes video data and performs various post-processing algorithms intended to optimize image quality for a particular combination of data source and display device. FIG. 2 is a block diagram showing an architecture for a video processor 200 according to an embodiment of the present invention. Video processor 200 includes a decoder 202, a post-processing pipeline 204, and a scanout module 206. Decoder 202 receives the video data in the format provided by the video source (which might be, e.g., MPEG-2, MPEG-4, NTSC, or any other format) and decodes it into an array of pixel color values (also referred to herein as pixels). Conventional decoder circuits and algorithms may be used, and decoder 202 may be configured to recognize and decode any number of different formats. In some embodiments, decoder 202 streams the pixels directly to post-processing pipeline 204; in other embodiments, decoder 202 writes the pixels to a frame buffer (e.g., in video memory 124 of FIG. 1), and post-processing pipeline 204 reads the pixels from the frame buffer.

Post-processing pipeline 204 includes a series of modules that perform various transformations on the pixel values provided by decoder 202. Each of these modules may implement conventional post-processing algorithms, using circuits specifically configured to perform the algorithm, general purpose logic circuits programmed to perform the algorithm, or a combination thereof.

Pipeline 204 can include any combination of post-processing modules. For instance, in the embodiment shown, a deinterlacer 212 is configured to convert interlaced data (e.g., NTSC-formatted video data) to non-interlaced data in the event that the display device supports progressive scan. Edge enhancer 214 is configured to perform edge enhancement algorithms in order to sharpen the image. LCD overdrive module 216 adjusts the pixel values to provide an "overdrive" signal that improves the response time of LCD monitors. Display scaling module 218 is configured to rescale the image to match the number of raster dots on the display device, e.g., by interpolating (filtering) adjacent pixels. These modules can be of generally conventional design.

Some or all of the modules in post-processing pipeline 204 are advantageously programmable (or configurable). For instance, as is known in the art, an edge enhancement algorithm implemented in edge enhancer 214 may have configurable parameters that fine-tune the algorithm. Display scaling module 218 may be configurable to perform different types of scaling; in one embodiment, display scaling module 218 can perform "basic" scaling using a 2×2-tap filter or "high quality" (HQ) scaling using a 4×5-tap filter. Examples of suitable filter algorithms (e.g., a weighted average over the taps) are known in the art. In addition, in some embodiments, different modules in post-processing pipeline 204 can be enabled or disabled.

In some embodiments, video driver 132 (FIG. 1) configures post-processing modules in pipeline 204 by generating state commands and transmitting the state commands to video processor 122. State commands may be generated in response to instructions from video playback program 130 or a user interface managed by video driver 132. State commands are propagated to the modules of pipeline 204 (FIG. 2) along a control path 220, and each module responds to some or all of the state commands; in some embodiments, state commands update parameter values stored in registers that are read by the modules of pipeline 204.

In accordance with an embodiment of the present invention, each module in post-processing pipeline 204 is controlled in part by a configurable clip rectangle supplied as a "CR" state command by the video driver (e.g., driver program 132 in FIG. 1). The clip rectangle, which specifies a region within the pixel array on which the module is to operate, can be defined to include any subset (or all) of the pixels in the array. The clip rectangle can be defined by specifying two-dimensional screen coordinates (x, y) for two corners of the rectangle, e.g., the upper left and lower right corners. A module that is responsive to the CR state command processes only pixels that are located inside this rectangle; pixels outside the rectangle are passed through without modification. If the clip rectangle is defined to include only a subset of the pixels, the module performs post-processing for some but not all of the pixels; examples are described below.

Scanout module 206 provides the pixels to a display device (e.g., display device 110 of FIG. 1) in accordance with the properties of the display device (e.g., refresh rate, analog or digital input format, etc.). In one embodiment, post-processing pipeline 204 writes the final pixel values to a frame buffer (e.g., in video memory 124 of FIG. 1), and scanout module 206 reads the pixel values sequentially from the frame buffer. The frame buffer can be double-buffered as described above. In one embodiment, scanout module 206 scans out frames of pixel data at a prescribed refresh rate (e.g., 80 Hz) regardless of any other activity that may be occurring in video processor 200 or elsewhere in a system of which video processor 200 is a part. In some embodiments, the prescribed refresh rate can be a user selectable parameter, and the scanout order may be varied as appropriate to the display format (e.g., interlaced or progressive scan). It should be understood that the refresh rate of the display need not correspond to the frame rate of the video data, which might be, e.g., 30 Hz for standard television data and the same frame can be scanned out multiple times if appropriate. Conventional circuits and algorithms for delivering pixel data to a display device can be used, and a detailed description is omitted as not being critical to understanding the present invention.

Figure 3:
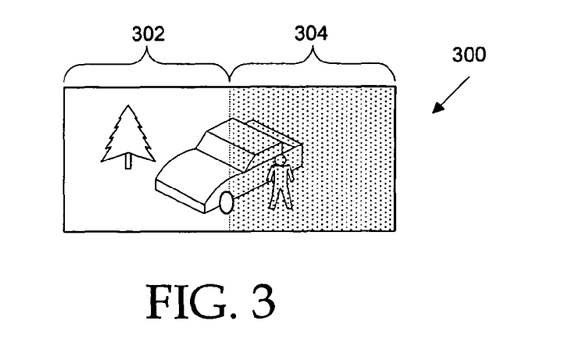
FIG. 3 illustrates a split-frame image according to an embodiment of the present invention.

In accordance with an embodiment of the present invention, post-processing pipeline 204 can be configured to operate on only a portion of the pixel array for each frame. As shown in FIG. 3, an image 300 (e.g., a frame of video data) is divided into a "processing region" 302 and a "control region" 304, with post-processing being performed only for pixels in processing region 302. Thus, all of the image is decoded and displayed, but only part of the image is post-processed prior to being displayed. The resulting "split-frame" image facilitates a side-by-side comparison of processed and unprocessed video data. (In the drawings herein, shading dots are used to indicate regions where unprocessed video data is displayed, e.g., control region 304.)

In some embodiments, split-frame post-processing can be used to demonstrate the benefits of various post-processing techniques. For instance, a viewer looking at image 300 might observe that processing region 302 is clearer and/or more vivid than control region 304. In other embodiments, the split-frame post-processing can be used to select or adjust parameter settings to optimize picture quality. For instance, a user might be able to manipulate the post-processing settings while viewing video data in split-frame mode; changes would be reflected in region 302 but not region 304.

Split-frame post-processing can be implemented in various ways. In one embodiment, a video driver (e.g., driver program 132 of FIG. 1) receives a command, e.g., via a user interface described below, defining the clip rectangle and propagates the corresponding CR state command to post-processing pipeline 204. The clip rectangle is advantageously defined such that the processing region is inside the rectangle and the control region is outside it, and the post-processing modules process only pixels in the processing region.

In some embodiments, display scaling module 218 is configured to apply HQ scaling to pixels inside the clip rectangle and basic scaling to pixels outside it. Applying scaling to the control region can be useful, e.g., if the number of pixels in the array does not correspond to the number of raster locations in the display device; resealing allows both portions of the image to be displayed at substantially the same size, reducing possible visual distraction.

Figure 4:
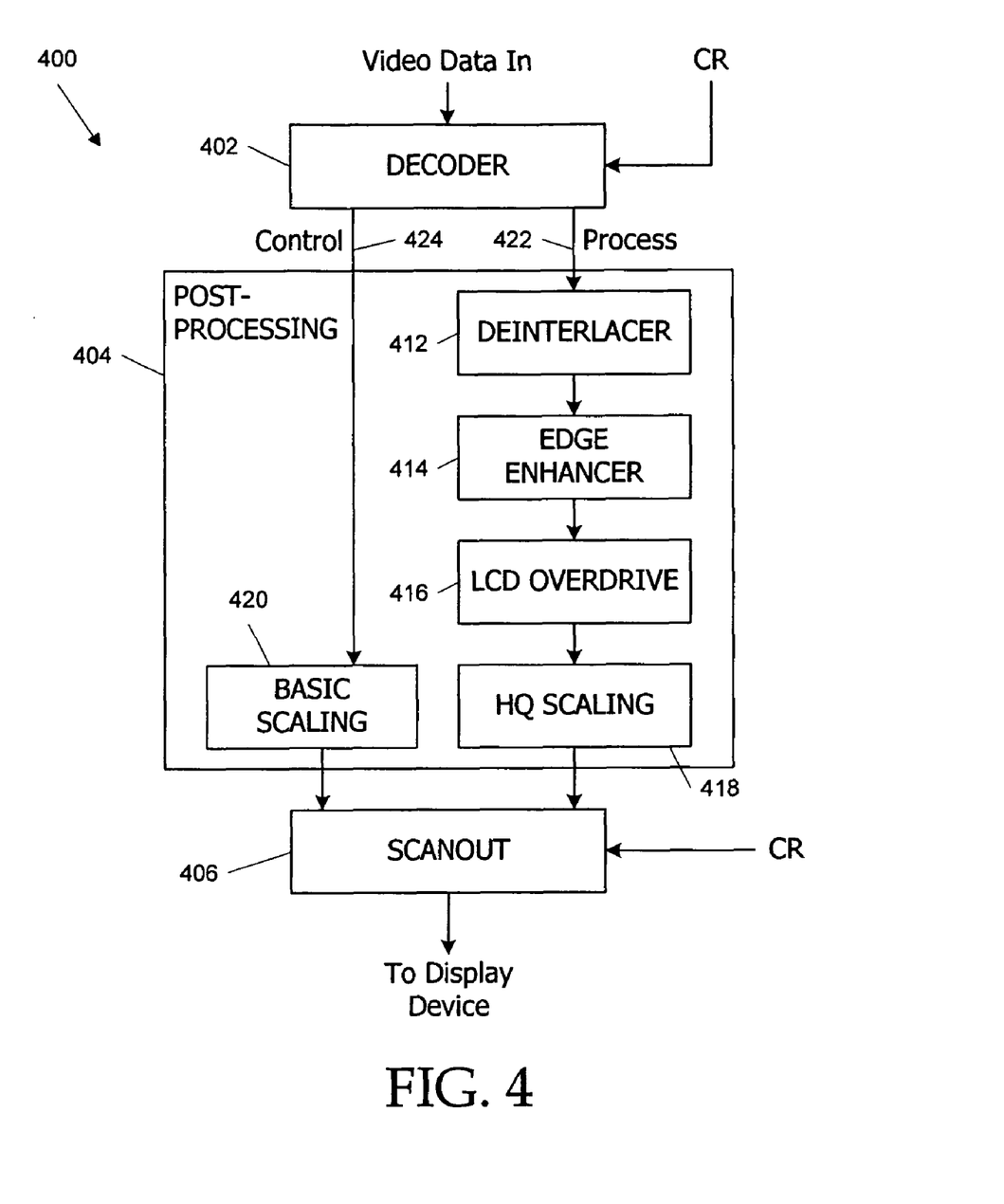
FIG. 4 is a block diagram of an architecture for a video processor according to an alternative embodiment of the present invention.

It should be noted that use of a clip rectangle command to control the modules is not required. For instance, in some embodiments, pixels in the control region may bypass some or all of the post-processing modules. FIG. 4 is a block diagram of an architecture for a video processor 400 according to an alternative embodiment of the present invention. Video processor 400 is generally similar to video processor 200 of FIG. 2, except that in processor 400, pixels in the control region bypass most of post-processing pipeline 404. In this embodiment, deinterlacer 412, edge enhancer 414, and LCD overdrive module 416 are generally similar to the corresponding modules in FIG. 2. Display scaling is provided by a high quality (HQ) scaling module 418 and a basic scaling module 420. In some embodiments, HQ scaling module 418 and basic scaling module 420 are implemented in the same processing engine with control parameters being provided to select the appropriate scaling algorithm for a given pixel; in other embodiments, separate processing engines are used.

Decoder 402 is similar to decoder 202 except that decoder 402 receives the CR state command and separates the pixels into a processing region and a control region. In one embodiment, this is done by selectively routing pixels along one or the other of a processing path 422 and a control path 424. In another embodiment, decoder 402 writes the pixels for the processing region and the control region to different buffers; deinterlacer module 412, edge enhancer module 414, LCD overdrive module 416, and HQ scaling module 418 are each instructed to operate only on the "processing" buffer (i.e., the buffer that contains pixels for the processing region) while basic scaling module 420 is instructed to operate on the "control" buffer (i.e., the buffer that contains pixels for the control region).

HQ scaling module 418 and basic scaling module 420 provide the final pixel values for the processed and control regions, respectively, to scanout module 406. In one embodiment, scaling modules 418 and 420 write the pixels to the appropriate sections of a display buffer as described above. In another embodiment, scanout module 406 receives the CR state command and selects the appropriate scaling module to supply each pixel.

It will be appreciated that the post-processing pipelines described herein are illustrative and that variations and modifications are possible. For example, in another alternative embodiment, the unprocessed image (or just the control portion) is copied to a temporary buffer. The pipeline processes the entire image and, prior to scaling (or scanout), the control portion is copied from the temporary buffer, replacing the corresponding portion of the processed image.

In some embodiments, each post-processing module is implemented in a dedicated configurable processing engine within a video processor. In other embodiments, the processing engines are programmable, allowing greater flexibility in the number and sequencing of post-processing algorithms. It is to be understood that any combination of post-processing algorithms may be implemented without departing from the scope of the present invention.

It should be noted that in some embodiments, the processing time per frame is reduced in split-frame mode as compared to a "normal" mode in which all pixels are post-processed. The frame rate of video playback need not be affected, as the pipeline can be paused as needed to make sure that each frame is displayed for the appropriate interval before being replaced.

User control of split-frame post-processing will now be described. In some embodiments, a graphical user interface is provided, e.g., via suitable program code included in a video driver program such as driver program 132 of FIG. 1. The interface appears on the display, and the user interacts with the interface using a mouse, remote control, or other suitable device.

Figure 5:
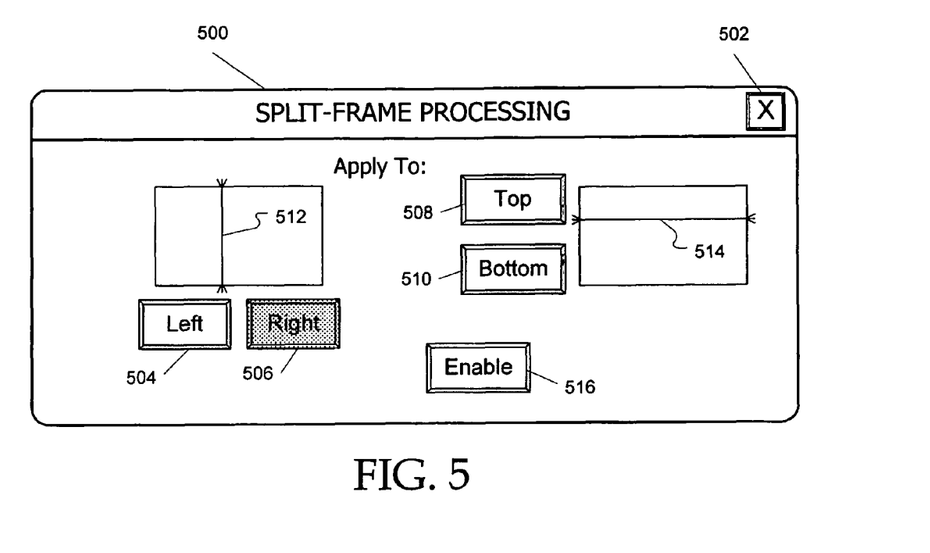
FIG. 5 is a diagram of a graphical user interface (GUI) for controlling split-frame post-processing according to an embodiment of the present invention.

FIG. 5 is a diagram of a graphical user interface (GUI) 500 for controlling split-frame post-processing according to an embodiment of the present invention. GUI 500 is a dialog box that appears when a user requests split-frame processing, e.g., from an "options" menu that can be accessed during operation of a video playback device. In some embodiments, GUI 500 appears as an overlay on whatever video image is currently displayed; the overlay may be made translucent or portions of the overlay may be made transparent so that the video image and the overlay are simultaneously visible to the user. GUI 500 can be closed by operating a "Close" button 502.

GUI 500 includes controls for defining the processing region. In the embodiment shown, the user can select Left side (button 504), Right side (button 506), Top region (button 508), or Bottom region (button 510) as the processing region. In some embodiments, only one of buttons 504, 506, 508, and 510 can be active at a given time.

In this embodiment, the user can also control the size of the processing region by adjusting left/right slider bar 512 (in the event that Left button 504 or Right button 506 is active) or top/bottom slider bar 514 (in the event that Top button 508 or Bottom button 510 is active). In other embodiments, a slider bar (horizontal or vertical as appropriate) is displayed across the entire screen when the user activates one of buttons 504, 506, 508, or 510, and the user can see directly which portion of the image is in the processing region while adjusting the slider bar.

Enable/disable toggle 514 controls whether split-frame post-processing is performed. In one embodiment, split-frame post-processing is performed only when toggle 514 is in its enabled state. By default, split-frame post-processing is advantageously disabled so that post-processing is applied to the entire image, resulting in an optimal image for viewing. Split-frame post-processing can be enabled when desired, e.g., for demonstrating the effect of the post-processing, for testing and adjusting post-processing algorithms and parameter settings, and so on. In one embodiment, when enable/disable toggle 514 is enabled, GUI 500 is not displayed so that the user can examine the split-frame video images without any overlay.

Figure 6:
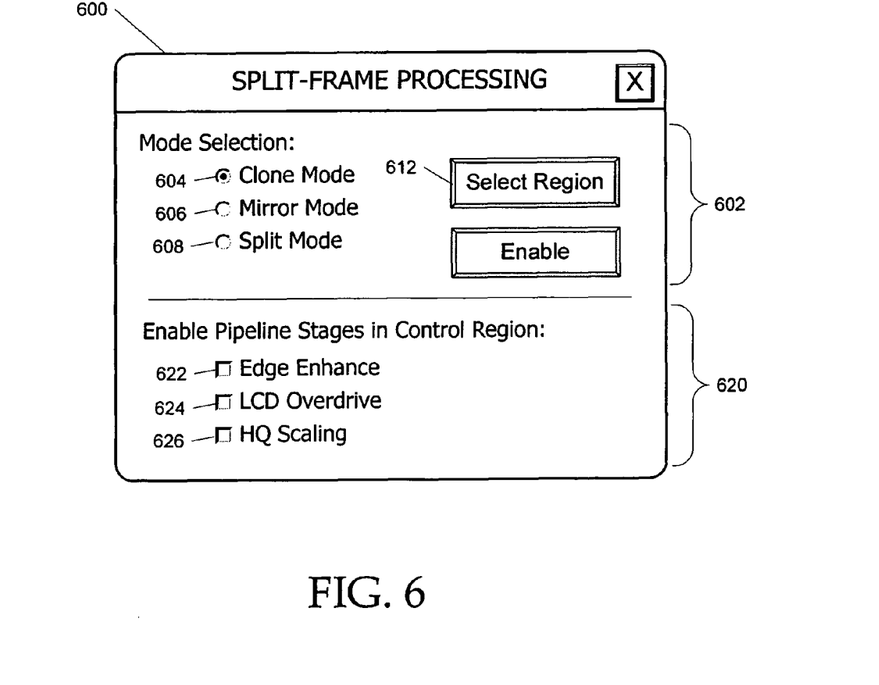
FIG. 6 is a diagram of a GUI for controlling split-frame post-processing with multiple modes according to an embodiment of the present invention.

Other embodiments may support other modes for facilitating side-by-side comparison of images with and without video post-processing. For instance, FIG. 6 is a diagram of a GUI 600 for controlling split-frame post-processing with multiple display modes according to an embodiment of the present invention. Like GUI 500, GUI 600 may be displayed as an overlay on a video image during operation of a video playback device; the overlay may be made translucent, or portions of the overlay may be made transparent.

Mode selection menu 602 provides radio buttons allowing the user to select among "clone" mode (button 604), "mirror" mode (button 606), and "split" mode (button 608). Split mode in this embodiment is similar to the mode shown in FIG. 3, with a vertical or horizontal boundary between the processing region and the control region. In split mode, when a "select region" button 612 is activated, controls similar to those of FIG. 5 appear, enabling the user to define the processing region as described above.

In clone mode, the same image is shown on both the left and right halves of the screen, with only one half being post-processed. This mode facilitates a direct side-by-side comparison of identical images with and without video post-processing. In one embodiment, when the user selects clone mode using button 604, the video playback is paused, and the pixel data for the current image is stored in an image buffer, which may be the frame buffer that is scanned out to the display device or a "back" buffer of a double-buffered system or another buffer. The current image advantageously remains displayed on the screen.

Figure 7A:
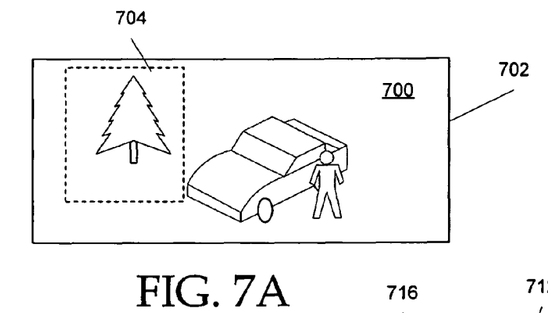
FIGS. 7A and 7B illustrate split-frame post-processing in a clone mode according to an embodiment of the present invention.

The user then selects a region of the current image to be cloned. For instance, as shown in FIG. 7A, a user viewing an image 700 on a display screen 702 can select rectangular region 704 for cloning. In one embodiment, GUI 600 is partially transparent, with the current image being displayed behind it, and the user operates a mouse or other pointing device to define a rectangular region to be cloned (e.g., by clicking and dragging across the desired portion of the image). In another embodiment, GUI 600 vanishes (e.g., is made wholly transparent) while the user is selecting the region to be cloned; a specially shaped cursor may be used to provide visual feedback during selection of the region to be cloned.

Once region 704 is selected, the pixels in the image buffer corresponding to region 704 are moved (e.g., copied) into the left half of the image buffer, forming a template image. Block transfer (Blit) or similar operations for moving pixels may be used. In some embodiments, region 704 is also enlarged or reduced so that the template image approximately fills the left half of the screen, e.g., using conventional filtering algorithms for enlargement or reduction of an image. During enlargement or reduction, the aspect ratio of the selected region 704 is advantageously preserved; if the pixel data for the template image does not completely fill the left half of the image buffer after enlargement, any pixels not filled are advantageously set to a "blank" state (e.g., populated with a color value denoting black). The template image is advantageously positioned in the buffer such that the right edge of the image aligns with the vertical center line of the screen; in some embodiments one or more columns of blank pixels may be placed at the right edge.

The template image is then copied (e.g., using Blit) into the right half of the image buffer, forming a cloned image. The left edge of the cloned image advantageously aligns with the vertical center line of the screen; in some embodiments one or more columns of blank pixels may be placed at the left edge. As with the template image, any pixels in the right half of the image buffer not filled by the cloned image can be set to a blank state.

Figure 7B:
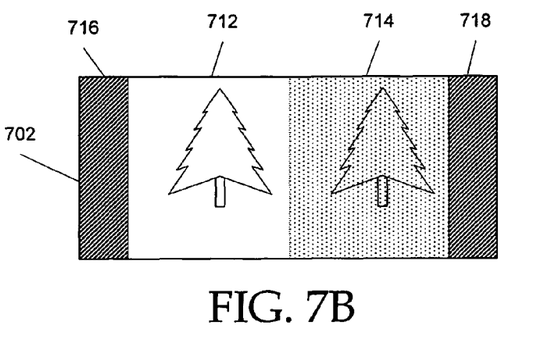

Split-frame post-processing, as described above, is then performed on the image, with the clip rectangle defined such that the processing region corresponds to the left half of the screen. Thus, post-processing is performed on the template image but not the cloned image, and the two images are displayed side-by-side. An example is shown in FIG. 7B. In FIG. 7B, the left half 712 and right half 714 of display screen 702 each show an enlarged version of the image in selected region 704 of FIG. 7A. The image in left half 712 (the processing region) is subject to post-processing while the image in right half 714 (the control region) is not. Black bars 716, 718 appear at the left and right edges of the display as a result of expanding region 704 so that its height corresponds to the height of display 702. The user can view this side-by-side comparison to see the effect of video post-processing.

Figure 8A:
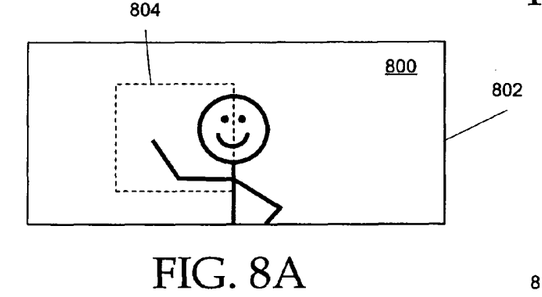
FIGS. 8A and 8B illustrate split-frame post-processing in a mirror mode according to an embodiment of the present invention.

Referring again to FIG. 6, mirror mode (selected using radio button 606) is similar to clone mode, except that the cloned image is a mirrored copy (about the vertical axis) of the template image. For instance, FIG. 8A shows an image 800 on a display screen 802 in which a rectangular region 804 has been selected. Region 804 is enlarged and shifted left (e.g., as described above for clone mode) to form a template image that approximately fills the left half of an image buffer, then mirror copied to form a mirrored image in the right half of the image buffer. In a mirror copy, the leftmost pixel in each row becomes the rightmost pixel and so on. Split-frame post-processing, as described above, is performed on the image, with the clip rectangle defined such that the processing region corresponds to the left half of the screen. Thus, post-processing is performed on the template image but not the mirrored image, and the two images are displayed side-by-side.

Figure 8B:
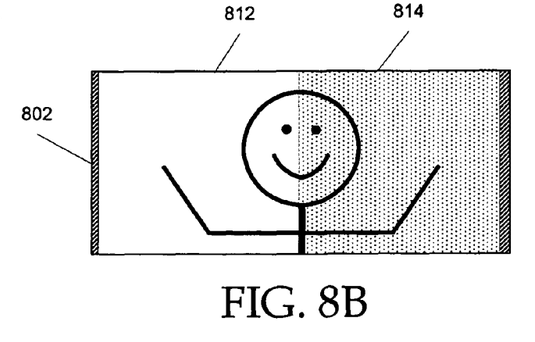

FIG. 8B shows a mirror-mode image generated from region 804 of FIG. 8A. The image in left half 812 (processing region) of display screen 802 is subject to post-processing while the mirror image in right half 814 (the control region) is not. As with clone mode, mirror mode facilitates a side-by-side comparison of the same image with and without post-processing. Where the image is bilaterally symmetric (e.g., a face) the mirror effect can make it easier for a viewer to compare the two halves.

It will be appreciated that the split-frame post-processing modes described herein are illustrative and that variations and modifications are possible. For instance, processed and unprocessed images could be displayed one above the other rather than side by side. In some embodiments, video can be played in mirror mode or clone mode; for each frame, the same region (defined relative to the image boundaries, not necessarily to objects in the image) would be selected, enlarged and copied. The user would see two versions of the same portion of each frame.

In addition, the processing and/or control regions need not be rectangular. For instance, the processing region could be an inset (e.g., for image 700 in FIG. 7A, region 704 could be identified as the processing region). In other embodiments, non-rectangular boundaries (e.g., circles or arbitrary polygons) could be used to define the processing and/or control regions.

Referring again to FIG. 6, in some embodiments, the user may also have the option to selectively apply some or all post-processing algorithms to the control region of the image. In section 620 of GUI 600, the user can enable or disable edge enhancement, LCD overdrive, and HQ scaling in the control region by checking or unchecking boxes 622, 624, 626. For instance, if the user wants to observe the effect of edge enhancement, he or she can check boxes 622 and 626; the control and processing regions would then differ only in whether edge enhancement is applied, allowing the user to see the effect of this algorithm. In one embodiment, when a box 622, 624, 626 is checked, the CR state command (see FIG. 2) provided to the corresponding module of post-processing pipeline 204 is changed so that the clip rectangle for that module encompasses the entire screen.

In another embodiment, checkboxes are used to control the application of post-processing in the processing region, with the control region remaining unprocessed. In still another embodiment, a separate set of checkboxes is provided for each region, and the user can apply a different combination of post-processing algorithms to each region and compare the results.

It will be appreciated that the user interfaces described herein are illustrative and that variations and modifications are possible. Other types of user interfaces may also be substituted for on-screen graphical user interfaces, including but not limited to interfaces with mechanical control devices (knobs, switches, buttons, etc.) disposed on the video playback system and electrically coupled to appropriate circuitry for detecting and processing user input; such interfaces may also provide lights or similar indicators configured to signal the user as to the current state of the system.

While the invention has been described with respect to specific embodiments, one skilled in the art will recognize that numerous modifications are possible. For instance, the video post-processing pipeline may implement any combination of post-processing algorithms in any sequence, not limited to the examples described herein. Split-frame post-processing can be performed in any video processor with programmable post-processing engines capable of receiving a clip rectangle command or other command defining a region within a pixel array to be processed. User interfaces for controlling split-frame post-processing can also be varied, and a GUI is not required.

Split-frame post-processing can be implemented in any device with video playback and post-processing capability, including but not limited to general-purpose computer systems; DVD or other video players (with or without recording capability) in a variety of form factors including component video players connected to an external display device as well as portable video players with integrated displays; digital television sets; handheld devices such as personal digital assistants or mobile phones; and so on.

Computer programs incorporating various features of the present invention may be encoded on various computer readable media for storage and/or transmission; suitable media include magnetic disk or tape, optical storage media such as compact disk (CD) or DVD (digital versatile disk), flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

While the present invention has been described with reference to specific hardware and software components, those skilled in the art will appreciate that different combinations of hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method for providing video data to a display via a video processor that includes a post processing pipeline having a plurality of programmable modules, the method comprising: defining, for a frame of the video data, a processing region and a control region; programming a first module of the post processing pipeline to perform a first post processing algorithm on pixels in the processing region and not on pixels in the control region; and providing video data for the control region and the processing region of the frame to the video processor, wherein the first module of the post processing pipeline performs the first post processing algorithm on pixels in the processing region and not on pixels in the control region and wherein the processing region does not overlap with the control region.

2. The method of claim 1 wherein the act of programming the first module includes transmitting to the post processing pipeline a state command defining boundaries for the processing region of the image, wherein the first module is configured to perform the first post processing algorithm only on pixels within the boundaries defined by the state command.

3. The method of claim 1 further comprising:
programming a second module of the post processing pipeline to perform a second post processing algorithm on pixels in the processing region and on pixels in the control region.

4. The method of claim 3 wherein the second post processing algorithm is a deinterlacing algorithm.

5. The method of claim 1 further comprising:
programming a second module of the post processing pipeline to perform a second post processing algorithm on pixels in the processing region and to perform a third post processing algorithm on pixels in the control region,
wherein the third post processing algorithm is different from the second post processing algorithm.

6. The method of claim 5 wherein the second and third post processing algorithms are two different scaling algorithms.

7. The method of claim 1 wherein the first post processing algorithm is one of:
a deinterlacing algorithm;
an edge enhancement algorithm;
an LCD overdrive algorithm; or
a scaling algorithm.

8. The method of claim 1 wherein the act of defining includes;
receiving user input selecting a desired processing region; and
determining a boundary of the desired processing region.

9. In a video processor, a method for providing pixel data to a display device, the method comprising: receiving a state command defining, for a frame of video data, a control region and a processing region; performing a first post processing algorithm on a first portion of the video data corresponding to the processing region of the frame and not on a second portion of the video data corresponding to the control region of the frame; and delivering video data for the control region and the processing region to the display device, wherein the delivered video data for the processing region has been processed by the first post processing algorithm and wherein the processing region does not overlap with the control region.

10. The method of claim 9 wherein the video processor includes a post processing pipeline having a plurality of programmable modules, wherein at least one of the programmable modules is responsive to the state command.

11. The method of claim 9 wherein the video data is received in an encoded form, the method further comprising:
decoding the video data.

12. The method of claim 11 wherein the video processor includes a post processing pipeline having a plurality of modules including a first module configured to perform the first post processing algorithm, and wherein the decoder is configured to deliver the video data corresponding to the processing region to the first pipeline module in response to the state command.

13. The method of claim 9 further comprising:
performing a second post processing algorithm on pixels in the processing region and on pixels in the control region.

14. The method of claim 13 wherein the second post processing algorithm is a deinterlacing algorithm.

15. The method of claim 9 further comprising:
performing a second post processing algorithm on pixels in the processing region and not on pixels in the control region; and
performing a third post processing algorithm on pixels in the control region and not on pixels in the processing region,
wherein the third post processing algorithm is different from the second post processing algorithm.

16. The method of claim 15 wherein the second and third post processing algorithms are two different scaling algorithms.

17. The method of claim 9 wherein the first post processing algorithm is one of:
a deinterlacing algorithm;
an edge enhancement algorithm;
an LCD overdrive algorithm; or
a scaling algorithm.

18. The method of claim 9 further comprising:
prior to performing the first post processing algorithm, modifying the video data for the frame such that the processing region and the control region each contain a copy of the same video data.

19. The method of claim 18 wherein the video data is modified such that the control region contains a mirrored copy of the video data in the processing region.

20. A video processor comprising: a decoder configured to receive video data and to generate frames of pixels from the video data; a post processing pipeline coupled to receive the pixels from the decoder, the post processing pipeline including a first programmable post processing module configured to apply a first post processing algorithm to the pixels; and a scanout module coupled to receive processed pixels from the post processing pipeline and configured to deliver the processed pixels to a display device, wherein the post processing pipeline is configurable such that the first programmable post processing module applies the first post processing algorithm to pixels in a processing region of a frame but not to pixels in a control region of the frame and wherein the processing region does not overlap with the control region.

21. The video processor of claim 20 wherein the post processing pipeline further includes a second programmable post processing module and wherein the post processing pipeline is further configurable such that the second programmable post processing module applies a second post processing algorithm to pixels in the processing region but not to pixels in the control region.

22. The video processor of claim 20 the post processing pipeline further includes a second programmable post processing module and wherein the post processing pipeline is further configurable such that the second programmable post processing module applies a second post processing algorithm to pixels in the processing region and applies a third post processing algorithm different from the second post processing algorithm to pixels in the control region.

23. The video processor of claim 20 wherein the first post processing module is configured to receive a state command defining a boundary of the processing region and to apply the first post processing algorithm only to pixels inside the boundary defined by the state command.

24. The video processor of claim 20 wherein:
the decoder is configured to receive a state command defining a boundary of the processing region and to write pixels in the processing region to a first buffer and pixels outside the processing region to a second buffer, and
the first programmable post processing module is configured to receive a command directing the first programmable post processing module to apply the first post processing algorithm only to pixels in the first buffer.

* * * * *